United States Patent [19]

Greenleaf

[11] Patent Number: 5,447,730
[45] Date of Patent: Sep. 5, 1995

[54] REHYDRATION BEVERAGE

[75] Inventor: John E. Greenleaf, Saratoga, Calif.

[73] Assignee: The United States of America as represented by the Administrator of the National Aeronautics and Space Administration, Washington, D.C.

[21] Appl. No.: 823,492

[22] Filed: Jan. 21, 1992

[51] Int. Cl.⁶ .............................. A61K 33/14
[52] U.S. Cl. ................................... 424/680
[58] Field of Search ......................... 424/680

[56] References Cited

U.S. PATENT DOCUMENTS 4,853,237  8/1989  Prinkkilä et al. .............. 424/680
4,874,606 10/1989  Boyle et al. ................... 424/680

Primary Examiner—Raymond Henley, III
Attorney, Agent, or Firm—Kenneth L. Warsh; Guy Miller; John G. Mannix

[57] ABSTRACT

A novel rehydration beverage containing sodium chloride, sodium citrate and aspartame useful for rapid restoration of hydration homeostasis. The beverage is particularly useful for restoration of normal body fluid volumes and their intracellular and extracellular distribution during a hypohydration state observed in astronauts and air passengers.

9 Claims, 2 Drawing Sheets

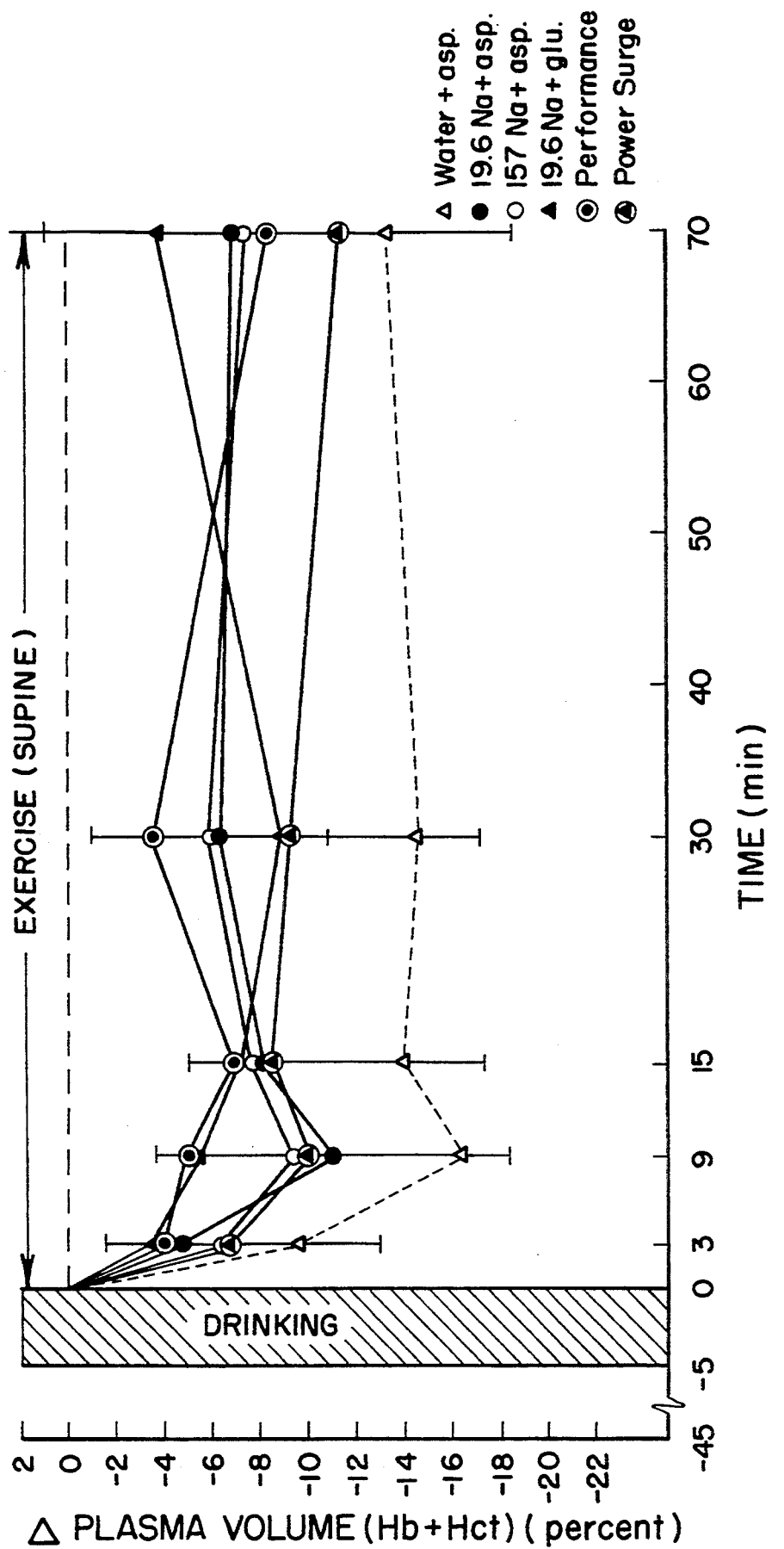

REHYDRATION BEVERAGE

The invention described herein was made by an employee of the United States Government and may be manufactured and used by or for the Government for governmental purposes without the payment of any royalties thereon or therefor.

BACKGROUND OF THE INVENTION

Field of Invention

This invention concerns a novel rehydration beverage useful for restoration of hydration homeostasis. This formulation is particularly useful for restoration of normal body fluid volumes and distribution in dehydrated or hypohydrated humans.

BACKGROUND ART AND RELATED ART DISCLOSURES

In health and under normal circumstances, the composition and volume of body fluids remain remarkably constant despite wide ranges of dietary intake, metabolic activity and environmental conditions. The mechanisms responsible for maintaining the hydration homeostasis, such as electrolytes, hormones, and acid-base equilibrium are closely interrelated.

In normal subjects the total body water is distributed between intracellular and extracellular spaces. Approximately two-thirds of total body water is inside cells (intracellular fluid) and one-third is located outside of cells (extracellular fluid). Approximately one-quarter of the extracellular fluid is the blood plasma. Since cell membranes in general are freely permeable to water, normal osmolality of the extracellular fluid (285 mOsm/kg water) is about equal to that of the intracellular fluid. Plasma osmolality consists mainly of plasma sodium [$Na^+$], plasma potassium [$K^+$], blood urea nitrogen [BUN], and blood glucose concentrations. The plasma osmolality is usually a convenient guide to intracellular osmolality. Plasma hyperosmolality, estimated from increased plasma sodium concentration (hypernatremia), induces cellular dehydration while plasma hypoosmolality (hyponatremia) induces cellular swelling.

Sodium and potassium are thus two very important elements responsible, to a large degree, for maintenance of hydration homeostasis. Sodium, which regulates the extracellular fluid volume, is located mainly in the extracellular fluid. It is determined mainly by a balance between dietary intake and renal excretion. Potassium, on the other hand, is located primarily in the intracellular fluid volume. While potassium is affected significantly by plasma hydrogen ion concentration (pH), sodium reacts quickly to alterations in water balance by changing extracellular and plasma fluid volumes.

Deficits or excesses of water are ultimately shared by the intracellular and extracellular fluid compartments. Chronic reduction of body water (hypohydration) from the extracellular and probably the intracellular compartments occurs in certain unusual situations such as during the exposure of astronauts to microgravity, of passengers to hypoxia in low pressurized airplane cabins, during high-mountain climbing, during heavy and extended periods of exercise or other demanding physical activity with limited water, or during extended water loss from diarrhea, vomiting or sweating.

Thus, it would be beneficial to provide a simple rehydration fluid, preferably in the form of a beverage, which could quickly replace body water, particularly the intracellular fluid.

Of particular interest is the rehydration of astronauts just prior to re-entry from microgravity, and just after landing. The current treatment for their hypohydration state is salt tablets (sodium chloride) and water. However, such treatment has limited value and may be even detrimental; for example, in subjects having dehydration-induced hypernatremia. The high level of sodium may lead to elevated blood pressure and requires a substantial additional amount of water. Moreover, to take salt tablets with water is not very appealing. To be optimally effective, salt tablets and water need to be taken in a ratio of 1 gram of salt to 100 ml of water; i.e., an isotonic solution. This procedure may be inconvenient and impractical for astronauts or those engaged in heavy exercise, particularly in places where the supply of water may be limited or difficult to obtain.

Thus, it would be advantageous to have available a means by which the normal hydration equilibrium between intracellular and extracellular fluids is restored in a convenient and practical way. Such a means is a premixed beverage of a proper composition which is able to restore hydration homeostasis to avoid excessive intake of salt requiring a substantial supply of water to be taken at the same time.

Attempts have been made previously to prepare rehydration drinks which provide the energy source and water for rapid rehydration. These beverages may contain mixtures of proteins, glucose, fructose, maltose, salts, and other additives such as aspartylhexahydrophenylalanine. These beverages and compositions are generally described in U.S. Pat. Nos. 4,592,909, 3,800,046; 3,676,553; 4,853,237; 4,508,740; 4,619,833; 4,738,856, 4,448,770; 4,652,454; and 4,486,413.

An exercise rehydration drink which claims to restore and maintain energy containing a small amount (0.026–0.26%) of free citric acid to increase palatability is disclosed in U.S. Pat. No. 4,042,684. An exercise rehydration drink to provide quick recovery during and after exertion in humans and animals is described in U.S. Pat. No. 4,322,407. Free citrate is added to maintain the pH in the range of 6.8–7.4 and to provide a source of energy. U.S. Pat. No. 4,551,342 describes beverage compositions especially suitable for flavor control in carbonated soft drinks. U.S. Pat. No. 4,874,606 describes a beverage containing sodium chloride, citric acid, and L-aspartyl-L-phenylalanine which increases the rate of gastric emptying and enhances restoration of body fluids in individuals dehydrated by exercise.

The current invention avoids many of the disadvantages accompanying the above fluid formulations. The rehydration drink of the current invention is designed to rehydrate and hyperhydrate astronauts just prior to re-entry from microgravity, climbers, soldiers, and sportsmen who have had excessive loss of body fluid for whatever reason, and to provide them with means to restore optimal hydration levels. Similarly, the drink is designed to prevent hypohydration during exposure of passengers to the low pressurized aircraft cabin.

The current rehydration drink consists of a unique and specific combination of sodium chloride and sodium citrate in combination with the artificial sweetener aspartame. This specific formulation provides optimal hydration for the extracellular and intracellular fluid volumes.

SUMMARY

One aspect of the current invention is a rehydration fluid which restores hydration homeostasis.

Other aspect of the current invention is a rehydration fluid which restores the normal balance between intracellular and extracellular fluid compartments.

Still another aspect of the current invention is a rehydration fluid consisting essentially of sodium chloride and sodium citrate.

Yet another aspect of the current invention is a method for fast, convenient, and practical restoration of water balance during hypohydration.

BRIEF DESCRIPTION OF DRAWINGS

FIG. 2 is a graph showing results of plasma volume changes in the exercise study after drinking the six different formulations.

DETAILED DESCRIPTION OF THE INVENTION

Figure 1:
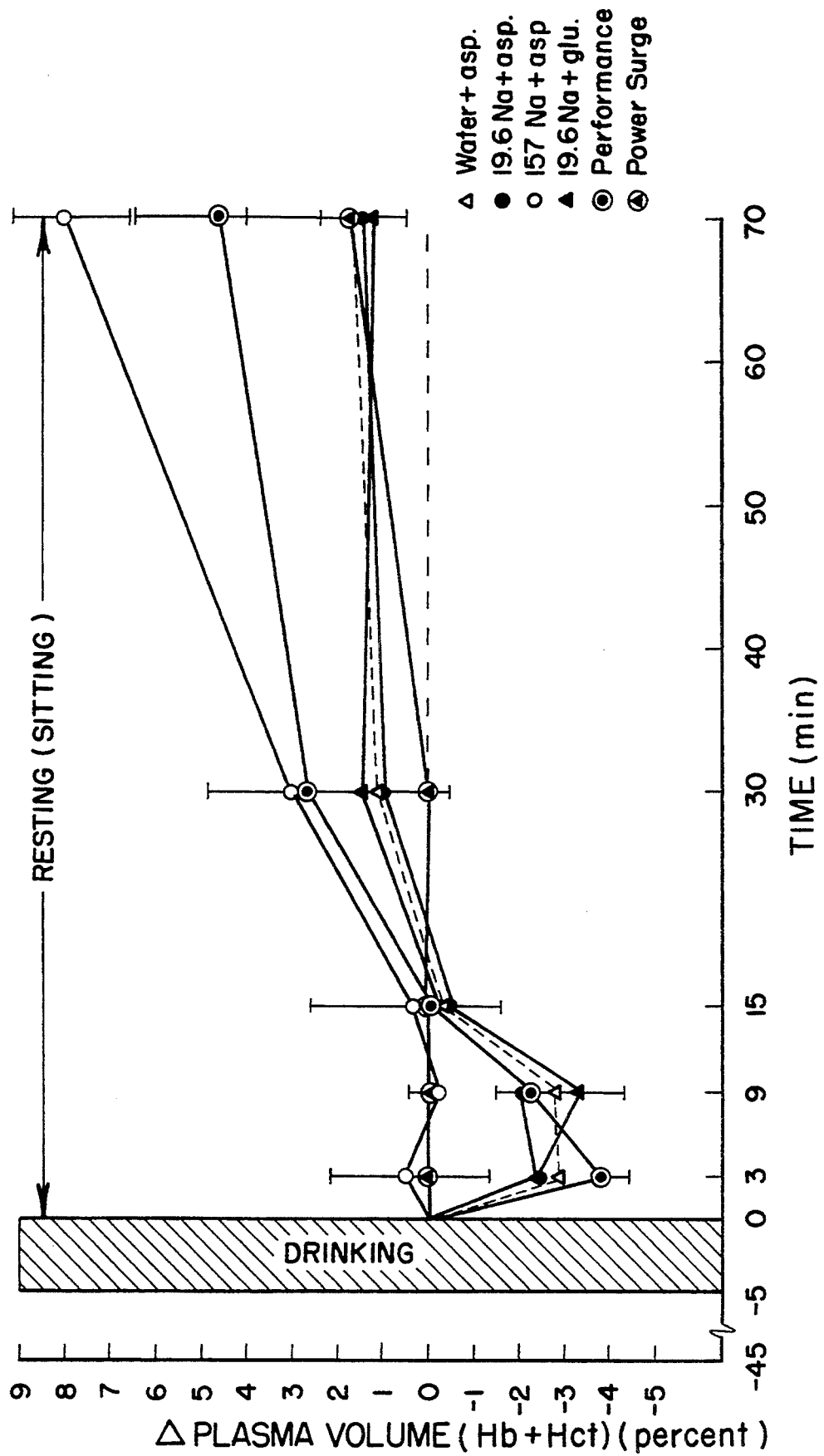
FIG. 1 is a graph showing results of plasma volume changes in the resting study after drinking the six different formulations.

This invention concerns a newly designed beverage useful for fast rehydration of hypohydrated subjects. The invention is based on the finding that substitution of a certain portion of sodium chloride with another sodium salt, particularly with sodium citrate, not only substantially improves the taste properties of the drink, but that it also improves restoration of plasma volume.

It has been shown previously in *J. Appl. Physiol: Respirat. Environ. Exercise Physiol.*, 48:838 (1980), that consumption of hypertonic-sodium retarded the rise of plasma volume at rest in a cool environment but not in the hot environment. Ingestion of isotonic-sodium or hypertonic-sodium resulted in a twofold greater increase in plasma volume at rest in the heat. During exercise and post-exercise recovery in the heat, plasma volume was higher following the consumption of hypertonic-sodium. The results of this study suggest that hypertonic drinks may be better for maintaining or increasing plasma volume in resting subjects.

The current invention is an extension of the above findings and concerns a specially designed rehydration fluid useful for restoration of homeostasis in hypohydrated subjects.

The level of body hydration influences physical performance and the physiological state of the organism. Total body water in man (about 50 liters) fluctuates within 1-2% (500-1,000 ml) under normal conditions (euhydration). Exposure to stressful conditions such as heat, exercise or weightlessness results in hypohydration. Hypohydration also occurs during exercise in a cool environment where fluid loss appears to come mainly from the intracellular fluid compartment.

The only practical way to rehydrate the body is by drinking. Under stressful conditions, or in conditions where the supply of water is limited, voluntary fluid intake usually does not keep up with the rate of fluid loss. The mechanism of this "involuntary" dehydration is unknown, but temperature and composition of the beverage, as well as gastric and intestinal emptying time which influence the volume consumed and its subsequent rate of absorption, seem to play important roles. Studies that have utilized animal preparations indicate that the rate of fluid absorption from intestinal lumen is maximal when the fluid concentration is about 300 mOsmol/kg; i.e., when the fluid has nearly isotonic concentration.

The rehydration fluid of this invention was designed to provide an osmolality which would assure such optimal fluid absorption and which would avoid the disadvantages associated with using plain sodium chloride in the form of salt tablets or otherwise. The new beverage was designed to prevent or treat hypohydration, quickly restore the hypohydration homeostasis, and to also taste good.

It has been found that such hypohydration beverage performs best when approximately one-half of the sodium chloride is substituted with sodium citrate in combination with an artificial sweetener to provide a good tasting beverage. Aspartame was found to be the preferred sweetener. The composition of such an hypohydration beverage is illustrated in Table 1 as beverage number IV. The components of beverage IV, per 2000 ml of total volume, are 9 g of sodium chloride, 15.44 g of sodium citrate and 0.72 g of aspartame. This beverage, containing only 0.36% of sodium ions, however, has an osmolality of 270 mOsmol/kg, which is very close to the optimal fluid absorption osmolality of about 285 mOsmol/kg.

Table 1 presents the compositions of the six different dehydration or hypohydration beverages; either commercially available Shaklee Performance (VI) and Power Surge (VII), or sweetened water—drink I, sweetened sodium chloride-drink II, and glucose/sodium chloride drink V, as well as the composition of drink IV of the current invention. The osmolality of these six beverages differ significantly. The osmolality of the sweetened water (I) is only 30 mOsmol/kg and the osmolality of sweetened sodium chloride drink (II) is also very low at 70 mOsmol/kg. The osmolalities of other three beverages (V), (VI), and (VII), on the other hand, are higher than the optimal 285 mOsmol/kg, with the glucose/sodium citrate containing drink (V) having an osmolality more than double (650 mOSm/kg) the optimal lever. Only drink (IV) of the current invention has an osmolality of 270 mOsmol/kg close to the optimal value 285 mOsmol/kg. Drink (III), isotonic sodium chloride, which consisted of 18 g of sodium chloride with water was not tested in this study.

It was, expected that drink (IV) would perform best in the hypohydrated subjects.

TABLE 1

| | Drink Composition (per 2000 ml) | | | | | |
|---|---|---|---|---|---|---|
| | I | II | IV | V | VI | VII |
| | | | Artificially Sweetened Solutions | | | |
| | Water | 0.045% Na | NaCl/NaCitrate (0.36% Na) | 9.7% Glucose + 0.045% Na | Shaklee* Performance | Power** Surge |
| Sodium Chloride (gm) | — | 2.24 | 9.00 | — | — | — |
| Sodium Citrate (gm) | — | — | 15.44 | 3.87 | 3.87 | 0.99 |
| Dextrose (gm) | — | — | — | 216.00 | 41.12 | 34.81 |
| Aspartame (gm) | 0.72 | 0.72 | 0.72 | — | — | — |

TABLE 1-continued

| | Drink Composition (per 2000 ml) | | | | | |
|---|---|---|---|---|---|---|
| | I | II | IV | V | VI | VII |
| | | | | Artificially Sweetened Solutions | | |
| | Water | 0.045% Na | NaCl/NaCitrate (0.36% Na) | 9.7% Glucose + 0.045% Na | Shaklee* Performance | Power** Surge |
| Shaklee Performance (gm) | — | — | — | — | 222.38 | — |
| Power Surge (gm) | — | — | — | — | — | 208.70 |
| Total | 0.72 | 2.96 | 25.16 | 219.87 | 222.28 | 208.70 |
| Total Volume (ml) | 2000 | 2000 | 2000 | 2000 | 2000 | 2000 |
| Ionic Concentration (meg/% wt/vol) | | | | | | |
| Na+ | — | 19.61/0.045 | 157/0.360 | 19.61/0.045 | 19.61/0.045 | 23.47/0.055 |
| K+ | — | — | — | — | 5.01/0.020 | 2.51/0.010 |
| Cl− | — | 18.95/0.067 | 76/0.270 | 18.95/0.067 | 4.98/0.018 | — |
| Mg++ | — | — | — | — | 0.40/0.002 | — |
| Ca++ | — | — | — | — | 1.96/0.016 | — |
| P++++ | — | — | — | — | 0.51/0.008 | — |
| Total Carbohydrate (% wt/vol) | — | 38.56/0.112 | 233/0.630 | 38.56/0.112 | 32.47/0.109 | 26.48/0.065 |
| Glucose | — | — | — | 9.716 | 1.850 | 1.74 |
| Fructose | — | — | — | — | 2.426 | 1.44 |
| Maltodextrine | — | — | — | — | 5.440 | 3.47 |
| Sucrose | — | — | — | — | — | 3.07 |
| Total | — | — | — | 9.716 | 9.716 | 9.72 |
| Osmolality | 30 | 70 | 270 | 650 | 380 | 390 |

*Shaklee Performance contains also other electrolytes and carboydrate sources.
**Power Surge is distributed by PERC Products, Moscow PA. Additionally, Power Surge contains maltodextrin, glucose, fructose, sucrose, citric acid, sodium citrate, potassium citrate, natural and artificial flavors, riboflavin, FD&C yellow dye #6.

From the Table 1 it is clear that only drink (IV) provides an osmolality close to that found to be optimal for fluid absorption from the intestinal lumen in resting subjects. Such absorption was found to be maximal when the osmolality of the restorative fluid was between 285-300 mOsmol/kg. Drink (IV) of the current invention, which has an osmolality of 270 mOsmol, contains at the same time, only 9 grams of sodium chloride.

To test the beverage of the current invention, a comparative evaluation of two commercially available formulations, Shaklee Performance (VI) and Power Surge (VII), as well as sweetened water (I), a low sodium solution (II), a glucose drink (V), and a combined sodium chloride/sodium citrate drink (IV), was performed on male volunteers. Plasma volume, electrolytes and osmolality have been determined in the test subjects in resting and exercise experiments. The six beverages were given to two groups of volunteers at weekly intervals according to the experimental protocol shown in Table 2.

The subjects were normal healthy men, 23–46 years old, weighing 74–78 kg. They were dehydrated for 24 hours prior to testing. They received no fluids and ate only a dry food. At 50 minutes before the first exercise or before the beginning of the resting period and 45 minutes before drink consumption, the body weight of the subjects was determined and urine samples were collected. Both groups began the test resting. The exercise group rested in the supine position, while the resting group rested sitting. At minus 15 and minus 5 minutes before the 70 minute-test period, venous blood samples were collected and the plasma volume of each subject was determined. At time zero, the subjects drank the specific drink chosen from drinks I–VII over 4–6 minutes. Then one group began to exercise in the supine position on a cycle ergometer at a moderately heavy load (71±%) of their maximal aerobic work capacity) for 70 minutes. The resting group of volunteers just sat for 70 minutes. During the 70 minute post-drinking period, venous blood samples were again taken at time 0, +3, +9, +15, +30, and +70 minutes. At about 75 minutes, body weight was again determined and urine samples collected.

TABLE 2

EXPERIMENTAL PROTOCOL

| 24 Hour hypohydration | Resting supine Resting sitting | D R I N K I N G | Exercise supine Resting sitting |
|---|---|---|---|
| −50  −40  −30  −20  −15  −10  −5 | | 0  +3  +9  +15 | +20  +30  +40  +50  +60  +70 Mins. |
| 0 | | 1/2   1/2   2   2   2 | 2                                  2/0 |

0 = Weight determined, urine samples collected
1 = Plasma volume #1
2 = Venous Blood samples obtained Mean body weights, drink volumes, and drinking times for the six drinks in both resting and exercising groups are shown in Table 3. The drink volume was 12 ml/kg of body weight. The exercising subjects drank somewhat less of the beverage, but drank it almost twice as fast as the resting group.

TABLE 3

Mean (SE) body weight, drink volume, and drinking time for the 6 tested beverages

| Drinks | I | II | IV | V | VI | VII |
|---|---|---|---|---|---|---|
| Body weight/Kg | | | | | | |
| A. Resting | 77.45 | 76.67 | 76.66 | 76.56 | 77.25 | 77.02 |
|  | 3.84 | 3.50 | 3.40 | 3.58 | 3.56 | 3.50 |
| B. Exercise | 74.85 | 75.00 | 75.27 | 75.22 | 75.14 | 74.99 |
|  | 3.86 | 4.05 | 4.09 | 4.37 | 4.00 | 3.77 |
| Drink volume/ml (12 ml/kg) | | | | | | |
| A. Resting | 927 | 922 | 920 | 919 | 927 | 924 |
|  | 51 | 43 | 41 | 43 | 43 | 42 |
| B. Exercise | 898 | 900 | 904 | 903 | 902 | 900 |
|  | 46 | 49 | 49 | 52 | 48 | 45 |
| Drinking time/min | | | | | | |
| A. Resting | 4.6 | 5.7 | 6.2 | 4.1 | 4.1 | 4.0 |
|  | 1.5 | 1.9 | 2.1 | 1.0 | 1.6 | 1.5 |
| B. Exercise | 3.6 | 2.3 | 4.0 | 2.8 | 3.0 | 3.4 |
|  | 0.5 | 0.2 | 0.8 | 0.8 | 1.2 | 0.7 |

In addition to body weight, drink volumes, and drinking time, changes in plasma volume, plasma osmolality, hemoglobin, hematocrit, and plasma sodium and potassium concentrations were measured. Changes in the resting and exercising group's plasma volumes were calculated from the blood hematocrit [plasma vol/total blood vol]×100] and hemoglobin concentration. The experimental conditions in the resting experiment simulated hypohydrated astronauts preparing for reentry. The experimental conditions in the exercise experiment simulated hypohydrated astronauts preparing for and undergoing extravehicular activity.

Results of these studies are shown in FIGS. 1 and 2 and Tables 4–6. FIG. 1 and Table 4 illustrate changes in plasma volume of the resting group where the change of plasma volume after drinking the formulations (I), (II), (IV)–(VII) ranged from −3.8% ($P<0.05$) at 3 minutes to +7.6% ($P<0.05$) at 70 minutes. During the initial 9 minutes, plasma volume actually decreased following drinks (I), (II), (V) and (VI). Plasma volume was essentially unchanged after consuming drinks (IV) and (VII). At 70 minutes following drinking, plasma volume had changed between +1.1% to +1.5% with drinks (I), (II), and (V); increased by 1.85% for drink (VII) by +4.6% with drink (VI), and by +7.6% with drink (IV) of the current invention.

Fluid formulations containing sodium compounds near isotonic concentrations (i.e., the same concentration as blood plasma) seemed better than more dilute solutions for restoring and increasing plasma volume in the group of resting hypohydrated men. Drink (II)—osmolality of 70 mOsm/kg, and drink (V)—osmolality of 650 mOsmol/kg; having the same ionic concentrations of sodium of 19.61/0.045 meq/% wt/vol, responded similarly to sweetened water (I) in restoring plasma volume after 24-hour dehydration. While all these drinks were able to increase plasma volume to pre-test levels, none has shown as positive response as the beverage of the current invention.

In terms of restoration and increase of the plasma volume, the most effective hypervolemic drinks in the resting experiment were beverages (IV) of this invention, and Shaklee Performance drink (VI). At 70 minutes drink (VI), however, increased the plasma volume by only one-half of that increased by beverage (IV) of this invention. The Power Surge beverage (VII) did not cause an initial decrease in plasma volume nor did it cause any appreciable increase following drinking.

FIG. 2 and Table 4 illustrate changes in plasma volume of subjects in the exercise experiment. In this group different changes in plasma volume occurred. In the resting study all 6 formulations resulted in positive trends and changes in plasma volume at 70 minutes; from 1.1 to 7.6%. In the exercise study, decreases from −5.2% to −14.0% of plasma volume were observed with all six drinks at 70 minutes. With no fluid intake the reduction in plasma volume at 70 minutes with this moderately heavy exercise load would have been about 12–14%. Thus, the change in plasma volume was negative for all drinks ranging from −4% to −10% at 3 minutes, −5% to −17% at 9 minutes and from −7% to −15% at 15 minutes. At 30 minutes of exercise, the drink (VI) performed the best at −4%, followed by drink (IV) of the current invention at −7%. At the end of 70 minutes of exercise, the drink (IV) of the current invention maintained the negative plasma volume almost at the same level of about −7% which was comparable to that of drinks (II), and better than drinks (VI), (VII), and (I). Thus, the drink (IV) was able to keep the plasma volume at a steady, albeit negative level during the 70 minutes of exercise.

With the exception of water, which appeared to be the least desirable drink, changes in plasma volume of the remaining 5 beverages were somewhat increased (less negative) when compared with that of non-drinking individual exposed to the same exercise. Performance of intensive exercise immediately after drinking any of these 6 formulations seemed to inhibit fluid transfer from the gastrointestinal system into the vascular system.

Table 4 lists data supporting FIGS. 1 and 2 and shows the effect of the beverage of the current invention on plasma volume during the resting and exercise periods following 24 hours of dehydration. In the resting group, there were only mild negative changes in the plasma volume. Normal plasma volume was restored quickly in about 15 minutes by drinking any of the six drinks. Surprisingly, following drinking of beverage (IV) of the current invention, the positive rebound was the highest of all beverages at both 30 and 70 minutes after drinking.

As already discussed, in the exercise group the negative change in plasma volume was much greater than in the resting group. While there was no complete recovery of plasma volume during exercise with any of the six beverages, beverage (IV) of the current invention was able to keep the plasma volume at an almost steady, albeit negative plasma level volume. This response was similar to that of sodium chloride in water combined with aspartame (beverage II). Power Surge (VI) and Shaklee beverages had a low restorative effect on plasma volume.

TABLE 4

| | | | Δ PLASMA VOLUME ML % | | | | | |
|---|---|---|---|---|---|---|---|---|
| | MINUTES | | INITIAL/M | | +3 | +9 | +15 | +30 | +70 |
| I | Resting | Mean | N/A | DRINKING | −2.7 | −2.9 | −0.5 | 1.1 | 1.5 |
| | | SE | | | 1.4 | 2.0 | 1.4 | 1.2 | 1.2 |
| | Exercise | Mean | 2768 | | −9.5 | −16.9 | −14.1 | −14.3 | −14.1 |
| | | SE | 192 | | 3.6 | 1.7 | 3.5 | 3.0 | 5.1 |
| II | Resting | Mean | N/A | | −2.5 | −2.0 | −0.8 | 0.9 | 1.1 |
| | | SE | | | 0.4 | 0.6 | 0.8 | 0.9 | 0.8 |
| | Exercise | Mean | 3021 | | −5.2 | −11.6 | −8.2 | −7.4 | −7.5 |
| | | SE | 245 | | 0.9 | 0.6 | 1.4 | 2.8 | 3.2 |
| IV | Resting | Mean | N/A | | 0.5 | −0.2 | 0.2 | 3.1 | 7.6 |
| | | SE | | | 1.7 | 1.9 | 2.2 | 1.7 | 1.6 |
| | Exercise | Mean | 2793 | | −6.9 | −10.0 | −8.1 | −7.2 | −7.6 |
| | | SE | 111 | | 1.2 | 1.0 | 1.8 | 4.2 | 2.7 |
| V | Resting | Mean | N/A | | −2.4 | −3.7 | −1.1 | 1.4 | 1.2 |
| | | SE | | | 0.8 | 0.9 | 0.8 | 1.4 | 1.4 |
| | Exercise | Mean | 2913 | | −3.7 | −5.9 | −7.8 | −9.6 | −5.2 |
| | | SE | 159 | | 2.0 | 3.8 | 5.0 | 6.4 | 5.9 |
| VI | Resting | Mean | N/A | | −3.8 | −2.3 | −0.3 | 2.8 | 4.6 |
| | | SE | | | 0.5 | 0.7 | 0.9 | 0.9 | 1.6 |
| | Exercise | Mean | 2862 | | −4.6 | −5.7 | −7.5 | −4.3 | −9.1 |
| | | SE | 84 | | 2.8 | 1.7 | 1.8 | 2.3 | 3.2 |
| VII | Resting | Mean | N/A | | 0.1 | 0.1 | −0.3 | 0.1 | 1.85 |
| | | SE | | | 1.3 | 0.4 | 0.8 | 0.5 | 0.5 |
| | Exercise | Mean | 2948 | | −6.9 | −10.4 | −8.8 | −9.7 | −13.5 |
| | | SE | 125 | | 2.0 | 3.3 | 2.8 | 3.3 | 3.5 |

Overall, the beverages containing sodium compounds near isotonic concentrations performed better than more dilute solutions for restoring and increasing plasma volume in resting, hypohydrated men. Of these, the drink of the current invention (IV) was clearly the best for restoring plasma volume.

Exercise performed after drinking all (one at a time) these beverages causes prolonged hypovolemia. However, the drink of the current invention (IV) maintained hypovolemia at only −7% of the pre-exercise plasma volume similar to that of sweetened sodium chloride drink (II).

Another criterion for beverage performance is the response of plasma osmolality, a concentration of osmotically active particles. Table 5 illustrates the plasma osmolality in resting and exercise groups. As discussed above, the most preferred osmolality of the drink for restoring hydration homeostasis is between 285-300 mOsmol/kg. The beverage (IV) of the current invention was able to maintain plasma osmolality steady in both the exercise and resting groups. The plasma osmolality increased steadily during 70 minutes of exercise from 300 to 307 mOsmol/kg, surpassing the performance of every other beverage, reaching the highest level of 307 mOSmol/kg 70 minutes after drinking. Only Power Surge (VII) and water with aspartame (I) beverages resulted in similar, albeit lower, plasma osmolality.

TABLE 5

| | | | PLASMA OSMOLALITY - CONCENTRATION | | | | | |
|---|---|---|---|---|---|---|---|---|
| | | | mOsmol/kg | | | | | |
| | MINUTES | | INITIAL | | +3 | +9 | +15 | +30 | +70 |
| I | Resting | Mean | 298 | DRINKING | 297 | 296 | 294 | 292 | 293 |
| | | SE | 2 | | 2 | 2 | 1 | 2 | 1 |
| | Exercise | Mean | 298 | | 302 | 302 | 301 | 300 | 306 |
| | | SE | 2 | | 2 | 1 | 1 | 1 | 1 |
| II | Resting | Mean | 298 | | 304 | 298 | 300 | 296 | 295 |
| | | SE | 2 | | 1 | 1 | 4 | 1 | 1 |
| | Exercise | Mean | 299 | | 300 | 300 | 301 | 301 | 302 |
| | | SE | 3 | | 4 | 3 | 3 | 3 | 3 |
| IV | Resting | Mean | 299 | | 303 | 303 | 301 | 304 | 299 |
| | | SE | 4 | | 6 | 3 | 5 | 5 | 5 |
| | Exercise | Mean | 300 | | 300 | 303 | 303 | 304 | 307 |
| | | SE | 2.5 | | 3.5 | 7 | 3 | 2 | 3 |
| V | Resting | Mean | 301 | | 300 | 303 | 305 | 301 | 300 |
| | | SE | 4 | | 4 | 2.7 | 8 | 4 | 5 |
| | Exercise | Mean | 294 | | 296 | 306 | 301 | 301 | 302 |
| | | SE | 1 | | 1 | 4 | 2 | 3 | 3 |
| VI | Resting | Mean | 299 | | 303 | 300 | 305 | 303 | 299 |
| | | SE | 2 | | 2 | 1 | 3 | 2 | 2 |
| | Exercise | Mean | 291 | | 295 | 297 | 297 | 297 | 298 |
| | | SE | 2 | | 2 | 2 | 0.4 | 2 | 2 |
| VII | Resting | Mean | 305 | | 306 | 307 | 310 | 305 | 306 |
| | | SE | 1 | | 3 | 1 | 2 | 1 | 3 |
| | Exercise | Mean | 304 | | 300 | 306 | 305 | 305 | 305 |
| | | SE | 2 | | 1 | 1 | 1 | 1 | 1 |

TABLE 6

| | | | PLASMA SODIUM CONCENTRATION/mEg/l | | | | | |
|---|---|---|---|---|---|---|---|---|
| | MINUTES | | INITIAL | +3 | +9 | +15 | +30 | +70 |
| Ia | Resting | Mean | 153 | DRINKING 153.5 | 152.5 | 153.2 | 152.5 | 151.9 |
| | | SE | 1.3 | 1.2 | 1.5 | 2.0 | 0.9 | 1.4 |
| | Exercise | Mean | 149.5 | 150.2 | 150.7 | 149.4 | 149.0 | 151.0 |
| | | SE | 1.0 | 1.2 | 1.5 | 1.5 | 1.7 | 0.4 |
| II | Resting | Mean | 159.2 | 166.0 | 161.1 | 162.4 | 158.7 | 162.3 |
| | | SE | 1.3 | 2.1 | 2.4 | 3.3 | 2.0 | 1.9 |
| | Exercise | Mean | 149.8 | 149.2 | 149.4 | 150.1 | 152.5 | 151.0 |
| | | SE | 0.6 | 0.8 | 0.7 | 0.8 | 2.1 | 1.8 |
| IV | Resting | Mean | 158.6 | 165.4 | 164.4 | 162.4 | 165.2 | 161.4 |
| | | SE | 1.7 | 3.4 | 4.5 | 2.4 | 2.8 | 2.0 |
| | Exercise | Mean | 149.4 | 150.1 | 150.4 | 150.4 | 150.2 | 153.6 |
| | | SE | 0.6 | 1.2 | 1.6 | 1.0 | 1.0 | 2.0 |
| V | Resting | Mean | 159.3 | 158.3 | 163.1 | 162.2 | 156.2 | 157.6 |
| | | SE | 1.7 | 1.8 | 2.1 | 4.5 | 2.1 | 3.0 |
| | Exercise | Mean | 148.2 | 144.6 | 145.3 | 148.9 | 148.8 | 151.4 |
| | | SE | 1.3 | 3.5 | 3.6 | 1.4 | 1.8 | 2.7 |
| VI | Resting | Mean | 155.2 | 161.2 | 160.8 | 162.8 | 159.4 | 160.2 |
| | | SE | 3.2 | 1.2 | 1.8 | 2.6 | 3.1 | 3.4 |
| | Exercise | Mean | 147.6 | 148.2 | 149.3 | 150.2 | 149.6 | 151.7 |
| | | SE | 1.4 | 1.0 | 0.6 | 0.9 | 0.3 | 1.1 |
| VII | Resting | Mean | 161.1 | 161.0 | 161.4 | 162.8 | 158.9 | 162.0 |
| | | SE | 0.9 | 2.0 | 0.8 | 2.2 | 1.5 | 3.1 |
| | Exercise | Mean | 151.9 | 150.5 | 150.7 | 150.1 | 149.4 | 152.0 |
| | | SE | 0.6 | 0.7 | 0.7 | 0.4 | 1.0 | 4.57 |

TABLE 7

| | | | PLASMA POTASSIUM CONCENTRATION (mEg/l) | | | | | |
|---|---|---|---|---|---|---|---|---|
| | MINUTES | | INITIAL | +3 | +9 | +15 | +30 | +70 |
| Ia | Resting | Mean | 4.93 | DRINKING 4.57 | 4.76 | 4.89 | 5.02 | 4.68 |
| | | SE | 1.49 | 0.61 | 1.07 | 1.58 | 1.64 | 1.07 |
| | Exercise | Mean | 4.21 | 5.56 | 4.72 | 4.76 | 4.74 | 4.82 |
| | | SE | 0.20 | 0.28 | 0.26 | 0.26 | 0.27 | 0.36 |
| II | Resting | Mean | 4.18 | 4.33 | 4.19 | 4.24 | 4.42 | 4.42 |
| | | SE | 0.09 | 0.16 | 0.16 | 0.23 | 0.07 | 0.04 |
| | Exercise | Mean | 4.28 | 4.46 | 4.63 | 4.69 | 4.76 | 4.78 |
| | | SE | 0.33 | 0.34 | 0.19 | 0.11 | 0.22 | 0.23 |
| IV | Resting | Mean | 4.36 | 4.29 | 4.27 | 4.16 | 4.30 | 4.23 |
| | | SE | 0.35 | 0.27 | 0.18 | 0.31 | 0.26 | 0.28 |
| | Exercise | Mean | 4.45 | 4.75 | 4.76 | 4.82 | 4.770 | 4.75 |
| | | SE | 0.38 | 0.27 | 0.19 | 0.21 | 0.24 | 0.08 |
| V | Resting | Mean | 4.16 | 4.15 | 4.11 | 4.08 | 4.05 | 3.90 |
| | | SE | 0.22 | 0.16 | 0.19 | 0.28 | 0.16 | 0.12 |
| | Exercise | Mean | 4.16 | 4.36 | 4.46 | 4.69 | 4.66 | 4.56 |
| | | SE | 0.28 | 0.30 | 0.39 | 0.19 | 0.23 | 0.42 |
| VI | Resting | Mean | 4.37 | 4.49 | 4.44 | 4.33 | 4.51 | 4.16 |
| | | SE | 0.26 | 0.30 | 0.20 | 0.26 | 0.22 | 0.40 |
| | Exercise | Mean | 4.40 | 4.76 | 4.68 | 4.82 | 4.71 | 4.68 |
| | | SE | 0.24 | 0.32 | 0.31 | 0.30 | 0.34 | 0.24 |
| VII | Resting | Mean | 4.08 | 4.14 | 4.07 | 4.06 | 4.13 | 3.84 |
| | | SE | 0.33 | 0.35 | 0.34 | 0.54 | 0.33 | 0.15 |
| | Exercise | Mean | 4.29 | 4.63 | 4.80 | 4.78 | 4.74 | 4.78 |
| | | SE | 0.16 | 0.30 | 0.18 | 0 | 0.21 | 0.23 |

Ions, such as sodium and potassium are important for maintenance of hydration homeostasis. Sodium, located primarily in the extracellular fluid regulates the extracellular fluid volume by the balance between dietary intake and renal excretion. An extraordinarily increased plasma sodium concentration influences a distribution of fluid and induces a shift of fluid from the intracellular to the extracellular space. Such a shift is undesirable as it disturbs hydration homeostasis and results in hypohydration. Higher levels of plasma potassium, which is located primarily in the intracellular fluid, indicate leakage of fluid from the intracellular fluid space.

The effect of all six tested beverages on the concentration of plasma sodium are shown in Table 6. Following drinking of beverage (IV) the plasma sodium in the resting group was maintained at 161–165 mEq/l compared with the initial sodium level of 158.6 mEq/l. Three minutes after drinking, the level of sodium increased to 165.4 mEq/l. This level decreased to slightly higher than initial levels during the 70 minute-interval after drinking. This effect was similar to that of the other beverages. Similar to plasma osmotic and volume response, consumption of beverage (IV) of this invention maintained and increased the sodium chloride concentration in plasma in the exercise group to the highest level of 153.6 mEq/l when compared to the average of 151 mEq/l for the other beverages.

The Table 7 shows the levels of plasma potassium concentrations in the resting group. Following drinking of beverage (IV) potassium decreased, slightly to 4.23 mEq/l from an initial level of 4.36 mEq/l showing that, following the 24 hour hypohydration, there was probably some slight transfer of water from the intracellular to the extracellular space. This decrease, however, was the second lowest only to the sodium beverage (II), which, in fact, showed an increase in potassium level.

All other beverages showed decrease in more than 0.2–0.3 mEq/l of potassium. All exercising subjects showed increases in plasma potassium concentrations during the 70 minutes of exercise.

Responses of all these parameters (plasma volume, osmolality, sodium, and potassium) show that the beverage (IV) of the current invention restored plasma volume to the highest level during resting and performed very well during exercise among all beverages tested for their ability to maintain hydration homeostasis.

UTILITY

The rehydration beverage of the current invention is useful for fast and convenient restoration of hydration homeostasis, particularly for restoration of plasma volume in resting individuals who are hypohydrated.

The beverage of the current invention may be useful for rehydration and restoration of normal body fluid levels in astronauts just prior to re-entry from microgravity and also just after landing. The beverage may also be useful for combating air passengers' dehydration following extended flight, and perhaps would help to prevent the adverse effects of jet-lag which is supposedly due, at least partly, to hypohydration resulting from extended time spent in the low pressurized cabins. The beverage could be given to air passengers during the flight, just before landing and after landing. Other hypohydrated individuals who might benefit from this beverage are sportsmen and others engaged in demanding physical labor in normal or in low pressure conditions or in excessive hot environments. The beverage may also be useful for treatment of cholera patients and for children suffering from diarrhea from other causes.

The beverage of the current invention supplies necessary sodium ions in the form of sodium chloride and sodium citrate to retain plasma water. The aspartame added to the beverage improves its taste and alleviates some of the undesirable salty taste which tends to inhibit voluntary consumption in hypohydrated individuals.

The following examples are included to illustrate the invention. They are not to be interpreted as limiting the scope of the invention.

EXAMPLE 1

Resting and Exercise Testing

This example presents the testing procedure for rehydration properties of the six beverages including the beverage of the current invention.

Two groups of 23–46 year old men were tested in a resting and in an exercise study. The subjects were tested individually. The protocol used for each group is presented in Table 2. Plasma volume and plasma protein, osmotic, and electrolyte shifts, as well as plasma sodium and potassium, hemoglobin and hematocrit were measured during 45 minutes resting followed in one group by 70 minutes of rest or in the second group by 70 minutes of submaximal exercise.

In each study the test subjects, previously dehydrated for 24 hours and resting for 45 minutes, drank one of the six fluid formulations (Table 1) at weekly intervals. These beverages were ingested slowly after the first 45 minutes of the resting (control) period. Weight was determined and urine samples collected (#0 in Table 2) at 45 minutes and after the 70-minutes experimental periods. Venous blood samples (#2 in the Table 2) were taken at −15 and −5 minutes of the control period before the drinking and at zero, +3, +9, +15, +30, and +70 minutes of the experimental (rest or exercise) period. Plasma volume (#1 in Table 2) was measured in the −15 to −5 minute interval of the control period.

All experiments were conducted in their entirety with the subjects clothed in shorts and shoes. The exercise was conducted with a Quinton Imaging/Ergometer, model 846T electronic bicycle ergometer. Maximal oxygen uptake ($V_{O_2\ max}$) was measured 1 week before the drinking experiments during the last minute of a progressively increasing load sequence with a low-dead-space Rudolph valve, a Pneumoscan Spirometer, and expired gas composition was analyzed by AMETEK $O_2$ and $CO_2$ analyzers.

Blood was drawn without stasis from an antecubital vein in an arm that was maintained relaxed in the horizontal position. Plasma was analyzed for sodium and potassium (Instrumentation Laboratories flame photometer, model C43) and for osmolality (Advanced Instruments, model 3DII).

Blood was spun at 11,500 rpm for 12 minutes in an International Centrifuge (model MB), the microhematocrit (Hct) was measured in quadruplicate and read on a modified International microcapillary tube reader sensitive to readings of ±0.1%: the measurement error was ±0.2%. Blood hemoglobin (Hb) was measured in triplicate with the cyanomethemoglobin method (Coulter hemoglobinometer).

Plasma volume was measured once near the end of the control period (−5 minutes) with Evan's blue dye (T-1824) from one 10-minute post injection blood sample. Plasma volumes at the other blood sampling times were calculated from changes in the hematocrit (Hct) and hemoglobin (Hb).

The mean corpuscular hemoglobin concentration was 100 [Hb]/Hct×0.96. Plasma proteins were measured with the biuret method.

The data were analyzed with the appropriate paired and unpaired t-tests and the null hypothesis was rejected when $P<0.05$.

Composition of the drinks is shown in the Table 1. Drinking protocol is shown in the Table 2. Drink volumes and drinking time are listed in the Table 3.

What is claimed is:

1. A rehydration fluid consisting essentially of 9.0 grams of sodium chloride, 15.44 grams of sodium citrate, and 0.72 grams of aspartame, all dissolved in a total of 2 liters of water.

2. A method for treating hypohydration and dehydration wherein human subjects in need of such treatment are given to drink a rehydration fluid consisting essentially of 9.0 grams of sodium chloride, 15.44 grams of sodium citrate, and 0.72 grams of aspartame, all dissolved in a total of 2 liters of water.

3. The method of claim 2 wherein the human subjects to be treated are dehydrated individuals.

4. The method of claim 3 wherein the dehydrated individuals are selected from astronauts, sportsmen or airplane passengers.

5. The method of claim 4 wherein airplane passengers ingest the rehydration fluid beverage during the air flight and after landing.

6. The method of claim 3 wherein the dehydrated individuals are human subjects suffering from diarrhea.

7. The method of claim 3 wherein the dehydrated individuals are human subjects suffering from cholera.

8. The method of claim 4 wherein the sportsmen are climbers suffering from high altitude hypohydration.

9. The method of claim 4 wherein the astronauts ingest rehydration beverage fluid just prior to the re-entering of the atmosphere phase and after the landing phase.

* * * * *